United States Patent [19]

Lemoine et al.

[11] Patent Number: 5,585,577
[45] Date of Patent: Dec. 17, 1996

[54] BEARING WITH A SENSOR ARRANGEMENT FOR OBTAINING AN INDICATION OF VARIOUS PARAMETERS WITHIN THE HOUSING OF THE BEARING

[75] Inventors: Richard L. Lemoine, Harwinton; John A. Butine, Torrington; Mark I. Jurras, III, Canton Center; Richard W. Browner, Waterbury; Paul E. Duffy, Winsted, all of Conn.

[73] Assignee: The Torrington Company, Torrington, Conn.

[21] Appl. No.: 565,222

[22] Filed: Nov. 30, 1995

Related U.S. Application Data

[63] Continuation-in-part of Ser. No. 336,026, Nov. 8, 1994, abandoned.

[51] Int. Cl.$^6$ ............................................. F16C 33/30
[52] U.S. Cl. ...................... 73/866.5; 374/153; 384/448
[58] Field of Search ............................ 73/9, 493, 660, 73/862.55, 866.5, 865.9; 374/153, 208; 324/173, 174, 167; 384/448; 439/17, 289

[56] References Cited

U.S. PATENT DOCUMENTS

| | | | |
|---|---|---|---|
| 1,934,799 | 11/1933 | Gunby | 439/17 |
| 2,265,998 | 12/1941 | Bruno | 439/289 |
| 2,961,875 | 11/1960 | Reumund . | |
| 2,983,556 | 5/1961 | Coan . | |
| 3,052,123 | 9/1962 | Gustafson | 374/153 |
| 3,387,250 | 6/1968 | Bjorn et al. | 439/17 |
| 3,792,434 | 2/1974 | Williams | 340/57 |
| 3,824,579 | 7/1974 | Waseleski, Jr. et al. | 340/269 |
| 3,900,812 | 8/1975 | Brewer | 73/862.55 |
| 4,074,575 | 2/1978 | Bergman et al. | 73/344 |
| 4,552,465 | 11/1985 | Anderson | 374/208 |
| 4,778,286 | 10/1988 | Kadokawa | 324/174 |
| 5,125,845 | 6/1992 | Benktander et al. | 439/16 |
| 5,145,379 | 9/1992 | Benktander et al. | 439/34 |
| 5,195,831 | 3/1993 | Faye et al. | 384/448 |
| 5,209,580 | 5/1993 | Nakayama | 384/448 |

FOREIGN PATENT DOCUMENTS

| | | | |
|---|---|---|---|
| 2554654 | 5/1976 | Germany | 439/17 |
| 987205 | 3/1965 | United Kingdom . | |
| 1378685 | 12/1974 | United Kingdom . | |
| WO-A-9413968 | 6/1994 | WIPO . | |

*Primary Examiner*—Robert Raevis
*Attorney, Agent, or Firm*—John C. Bigler

[57] ABSTRACT

One or more sensors are mounted on the inside surface of a stationary race/sensor mount assembly in the bearing housing. A parameter sensed by the sensor is electronically fed to the outside surface of the stationary race/sensor mount assembly and detected by a transmitter mounted in the housing. The detected information is electrically fed from the transmitter to an electronic system located outside the housing.

10 Claims, 6 Drawing Sheets

5,585,577

BEARING WITH A SENSOR ARRANGEMENT FOR OBTAINING AN INDICATION OF VARIOUS PARAMETERS WITHIN THE HOUSING OF THE BEARING

This application is a continuation-in-part of application Ser. No. 08/336,026, filed Nov. 8, 1994, now abandoned.

BACKGROUND OF THE INVENTION

This invention relates to bearings. More particularly, this invention is a combination of elements including a sensor to monitor conditions within the bearing and to transmit the information outside of the bearing housing.

There are numerous bearing applications where the bearing is mounted in a housing that denies access to the bearing by servicing personnel. There are bearing performance characteristics that are best measured from inside the bearing for a number of different reasons. For instance, temperature-measurement devices are more responsive the closer they are to the source of heat generation. Vibration monitors are less affected by noise if they are installed inside the bearing. In using both of these types of sensors, a more reliable measurement is obtained if the sensor is permanently mounted within the bearing eliminating installation differences and misapplication of the sensor.

Furthermore, in applications where the bearing is transferred to a number of different locations during its life, the ability to maintain the historical data pertaining to an individual bearing is of great advantage in diagnosing bearing conditions.

While better measurements are obtained from within the bearing, the information must be made available to the personnel responsible for servicing the bearing for this information to be useful in diagnosing problems occurring in the bearing and surrounding equipment. Therefore, only if a method can be devised to relay this information out of the bearing will a measurement taken inside the bearing be of value.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a combination of elements by which the conditions within the bearing can be transmitted outside the bearing housing and measured without requiring the use of solid wires at the interface of the outer race of the bearing and the inside surface of the housing. A rotatable member which may be a rotatable shaft within the housing or a inner rotatable race within the housing is surrounded by a stationary annular race/sensor mount assemble which has a greater inside diameter than the outside diameter of the inner race. A plurality of rollers are located in the annular space between the race/sensor mount assembly and the inner race. At least one sensor is located on the inside surface of a sensor mount. Electrical contacts are located on the outside surface of the sensor mount. Electrical signals are fed from the sensor to the electrical contacts. A transmitter is mounted in the housing. The transmitter has members which are in contact with the electrical contacts located on the outside surface of the sensor mount. There is no solid wire contact of the electrical contacts located on the outside surface of the sensor mount and the transmitter mounted in the housing. The housing has holes extending from the transmitter through the housing for receiving wire for transmitting signals from the transmitter to the electronic systems located outside the housing.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

In the various figures like parts are referred to by like numbers.

Figure 1:
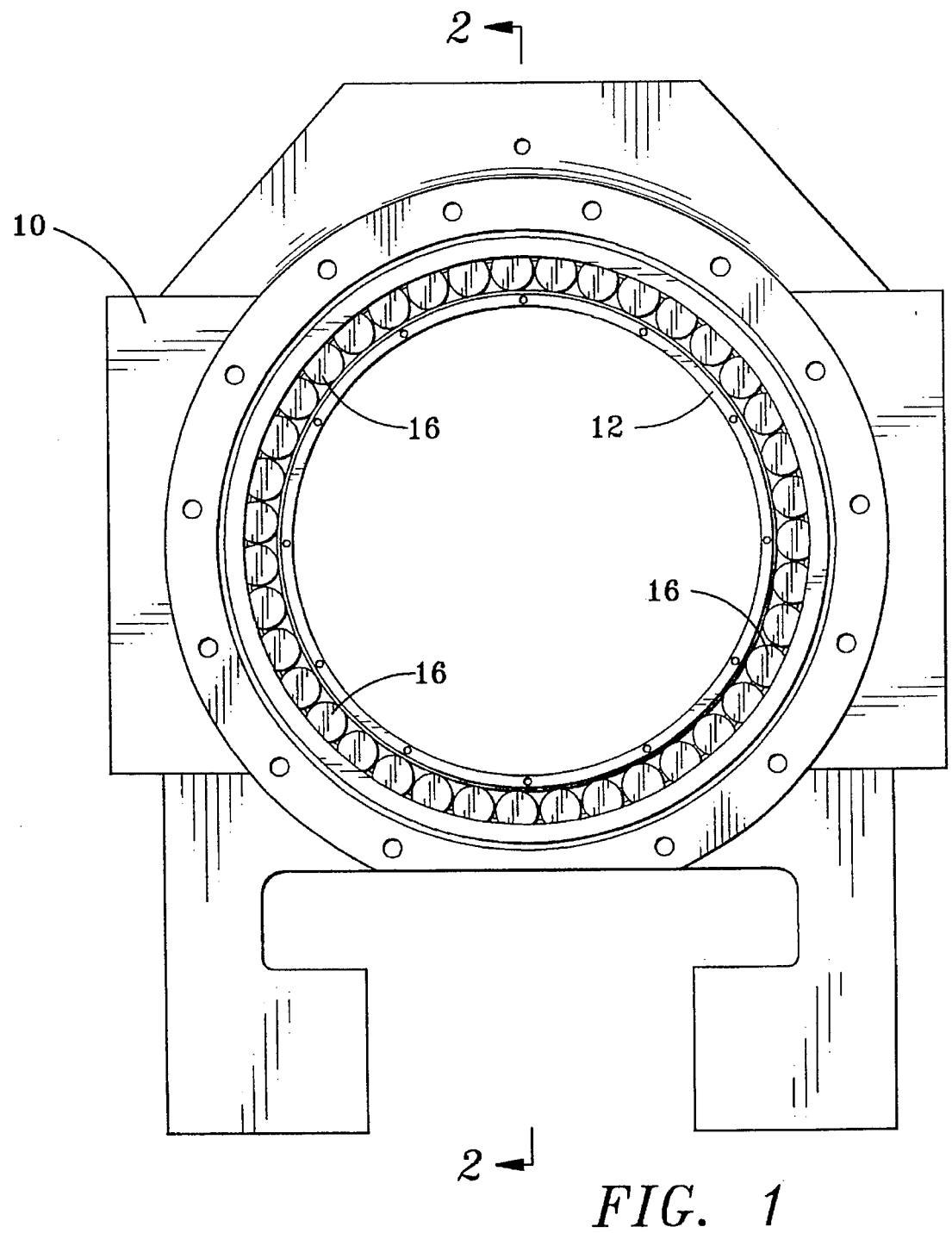
FIG. 1 is a front view of a large bearing system such as the large bearing used in steel mills.
Figure 2:
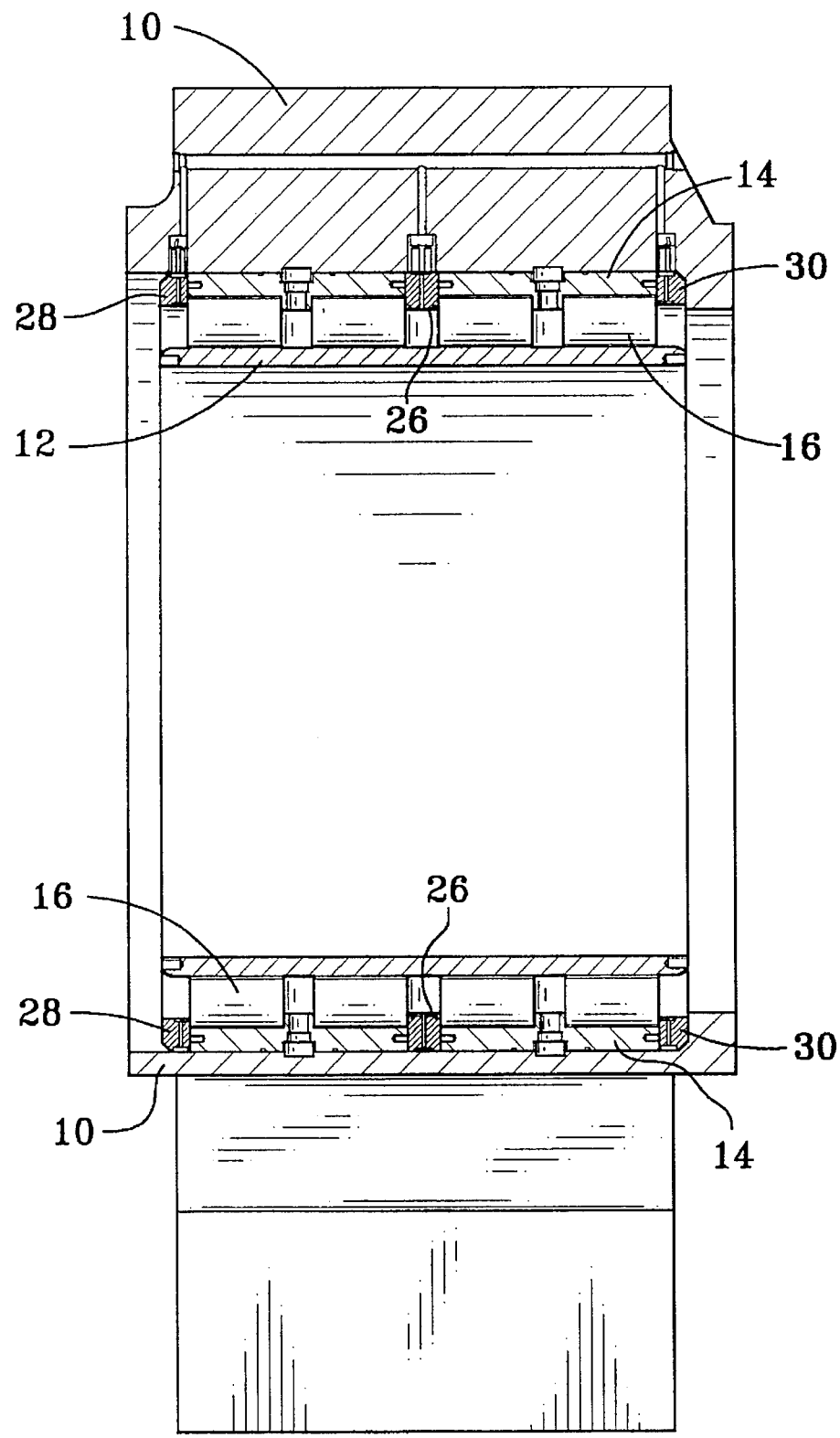
FIG. 2 is a view taken along lines 2—2 of FIG. 1.
Figure 3:
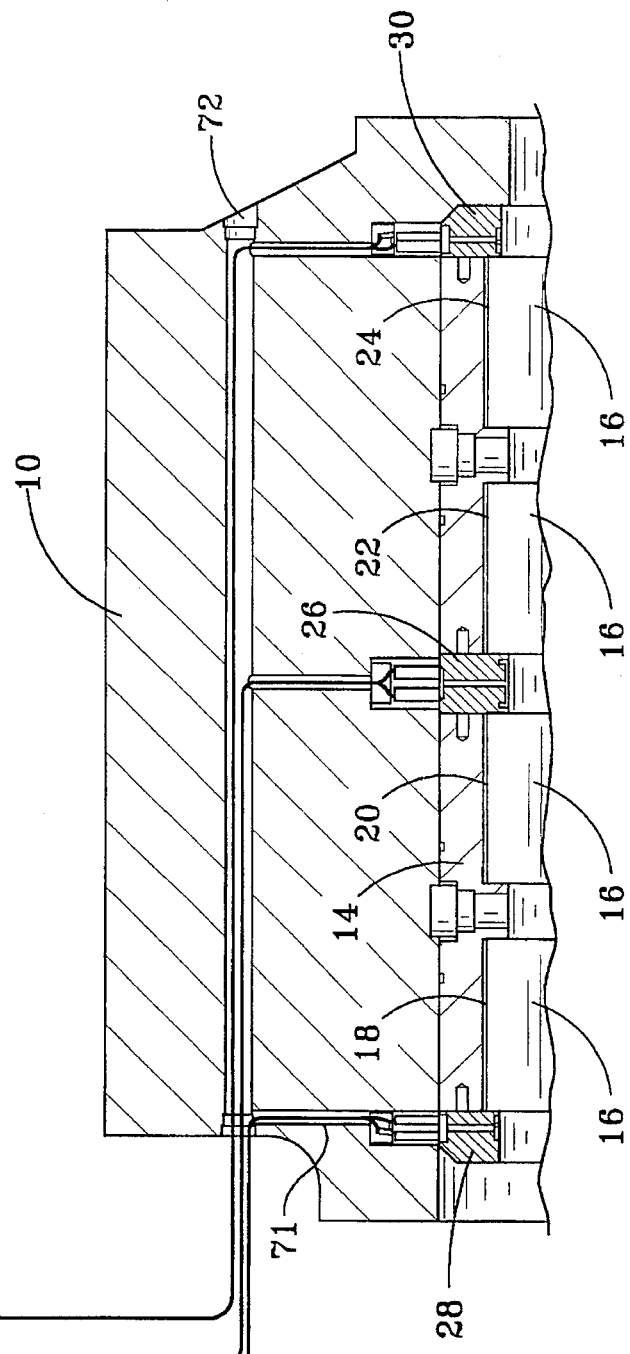
FIG. 3 is a fragmentary view on an enlarged scale showing a part of the bearing system shown in FIG. 2.

Referring to the drawings, and more particularly to FIG. 1, FIG. 2, and FIG. 3, a housing 10 of the type used for supporting large bearings such as those used in steel mills is shown. A rotatable member 12 (see FIG. 2) is rotatably mounted within the housing 10. As shown in FIG. 2, the rotatable member 12 is a rotatable race; however, it is to be understood that under some circumstances and with some bearings, rather than having a rotatable race, a rotatable shaft could extend entirely through the bore in the housing 10 and the shaft serve as a race.

A stationary race/sensor mount assembly 14 (see FIG. 2 and FIG. 3) is also mounted within the housing 10. The race/sensor mount assembly 14 has a greater inside diameter than the outside diameter of the race 12. A plurality of rollers 16 is located in the annular space between the race 12 and the race/sensor mount assembly 14.

The race/sensor mount assembly 14 has raceways or race-roller contact areas 18, 20, 22, and 24. The race/sensor mount assembly 14 also has a sensor mount 26 at its approximately axial center and sensor mount 28 at one axial end and sensor mount 30 at the other axial end. Thus, the race/sensor mount assembly 14 within the housing serves not only as a means to provide raceways for the rollers 16 but also as a means to provide mounts for the sensors.

In the drawings three sensors axially spaced are shown. However, the actual number of sensors is dependent on how much resolution is wanted and also on the size and length of the bearing and area to be sensed by the sensor. However, of course, at least one sensor must be used. Parameters which can be sensed within the bearing include, but are not limited to: temperature, vibration, speed, and load.

Figure 4:
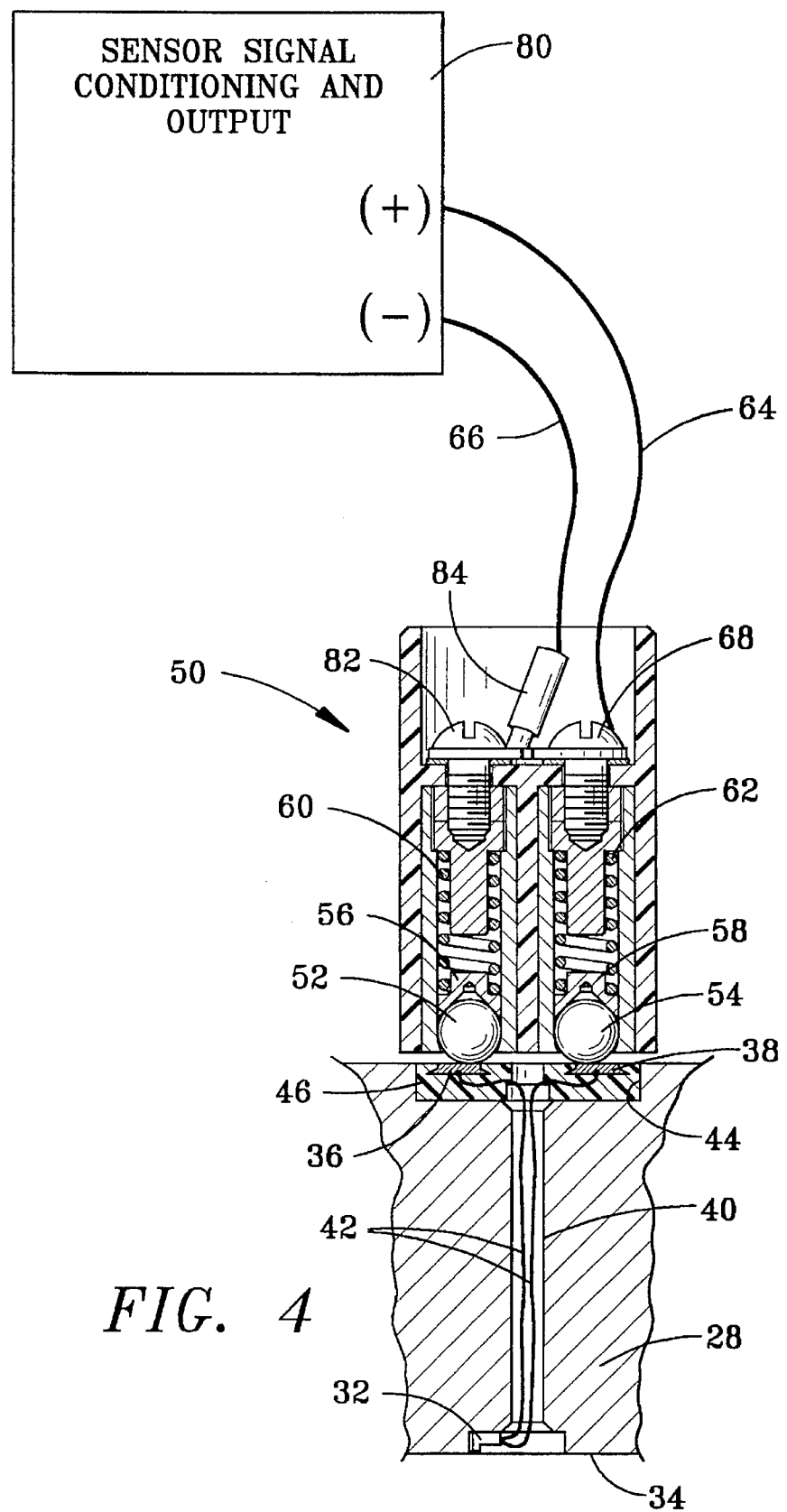
FIG. 4 is a sectional view showing the electrical system for transmitting the information sensed by the sensor to the outside of the housing.
Figure 5:
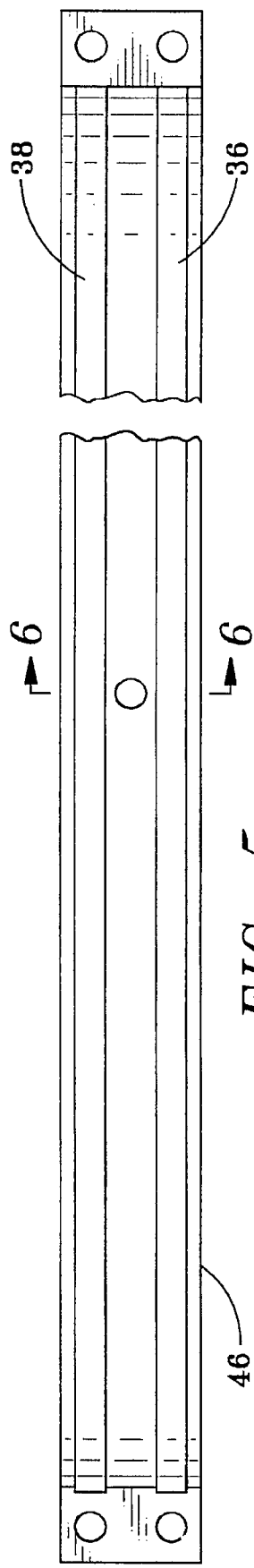
FIG. 5 is a top view showing the manner in which the contact strips on the outer race are mounted.
Figure 6:
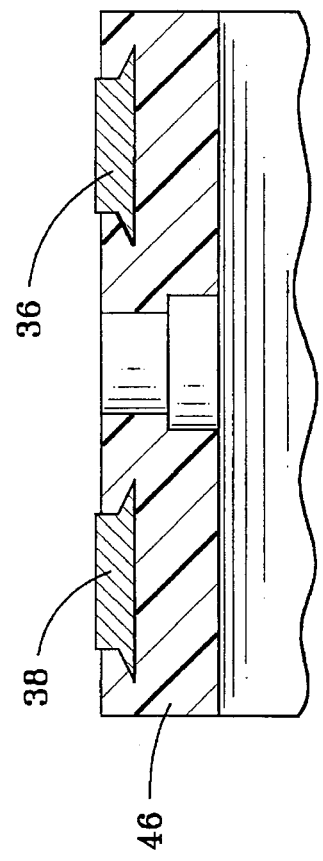
FIG. 6 is a fragmentary view on an enlarged scale taken generally along lines 6—6 of FIG. 5.

As shown in FIG. 4 a sensor 32 is mounted on the inside surface 34 of the sensor mount 28. Electrical contacts 36 and 38 are located on the outside surface of the sensor mount 28. A hole 40 extends from the sensor 32, through the sensor support 28 and up to the area of the electrical contacts 36 and 38. Electric wires 42 extend through the hole for sending electric signals from the sensor to the electrical contacts. The mount 28 of the race is provided with a groove 44. The electrical contacts 36 and 38 may consist of two nickel-plated brass strips laid side-by-side in the groove 44 and insulated from the bearing by a layer of plastic insulation 46.

The groove 44 in the outer surface of the sensor mount 28 extends circumferentially partially or fully along the outside surface of the sensor mount 28. The electrical contacts 36 and 38 and the insulation 46 also extend circumferentially partially or fully along the outside surface of the sensor mount. Multiple sets of electrical contacts 36 and 38 with insulation 46 may be mounted at different circumferential locations around the groove 44 to allow contact with the transmitter 50 for different angular orientations of the sensor mounts 26, 28, 30 within the housing 10. In this way different sensors 32 may be connected to the output electronic system 80 through each transmitter 50.

Referring to FIG. 4 a transmitter 50 has a pair of balls 52 and 54 in contact with the electrical contacts 36 and 38, respectively. Balls 52 and 54 are seated in ball seats 56 and 58 respectively and are biased against the electrical contacts 36 and 38 by springs 60 and 62 respectively. Wires 64 and 66 are connected to the terminals 68 and 82, through terminal lug 84, respectively. The wires 64 and 66 extend through the ports 71 and 72 in the housing 10 (see FIG. 3). The wires lead out from the housing 10 to a sensor signal conditioning and output electronic system 80.

For convenience, the sensor 32 may be a simple resistive temperature device (RTD) that is electrically wired to the electrical contacts 36 and 38 by electric wires 42. For example, a typical platinum RTD (Pt100) has a resistance of 100 ohms at 32 degrees F and a resistance of 177.5 ohms at 400 degrees F, a change of approximately 0.21 ohms per degree F. The electronic system 80 may then be an ohmmeter with its reading interpreted as temperature.

Alternatively, the electronic system 80 may include electronic circuitry to convert the output of the sensor 32 to a standard current loop and to linearize the output signal. One standard current loop, for example, known as a 4–20 milliampere (mA) current loop, provides a current that varies from 4 mA, for the minimum sensor signal level, to a current of 20 mA, for the maximum sender signal level. The linearized output signal may then be connected to an ammeter to indicate temperature.

Figure 7:
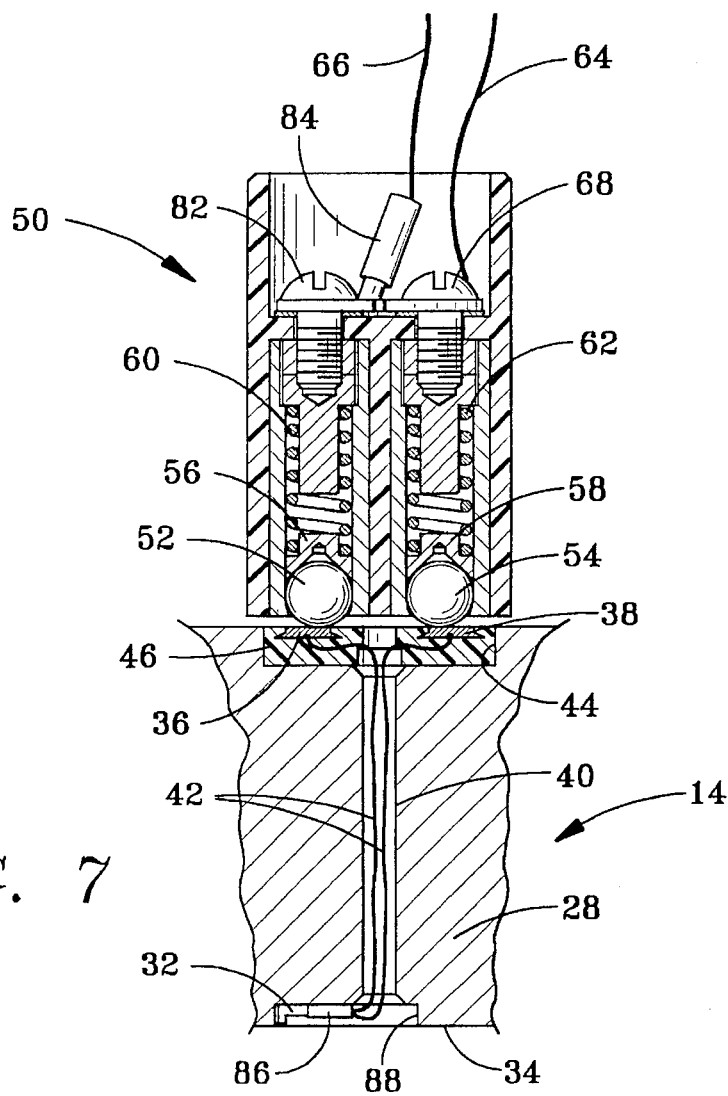
FIG. 7 is a sectional view similar to FIG. 4 showing the electrical system for an alternative embodiment of the present invention.

FIG. 7, similar to FIG. 4, shows an alternative embodiment in which a signal conditioning device 86 is positioned within the stationary race/sensor mount assembly 14. The signal conditioning device 86 may be mounted at various locations within the bearing, such as, for example, in the hole 40, in the groove 44, or on the inside surface 34. A recess 88, larger than that of FIG. 4, may be provided on the inside surface 34 to accommodate both the sensor 32 and the signal conditioning device 86, as shown.

The signal conditioning device 86 includes electronic circuitry to convert the signal of the sensor 32 to a standard current loop and to provide linearization of the conditioned signal, similar to circuitry described above with respect to electronic system 80. The purpose of locating the signal conditioning device 86 within the bearing is to minimize errors caused by contact resistances of the transmitter 50. Compact integrated circuits suitable for use as the signal conditioning device 86 are available from various suppliers, for example, Burr-Brown of Tucson, Ariz.

The contact resistance of the transmitter 50 may be affected by dirt, corrosion and wear of electrical contacts 36 and 38, the balls 52 and 54, the ball seats 56 and 58, the springs 60 and 62 and by differences in mounting geometry when the bearing is removed from the housing and reinstalled. Because the signal is converted to a standard current loop and linearized before it is transmitted out of the bearing, any errors caused by changes in the contact resistance of the transmitter 50 are significantly reduced.

Figure 8:
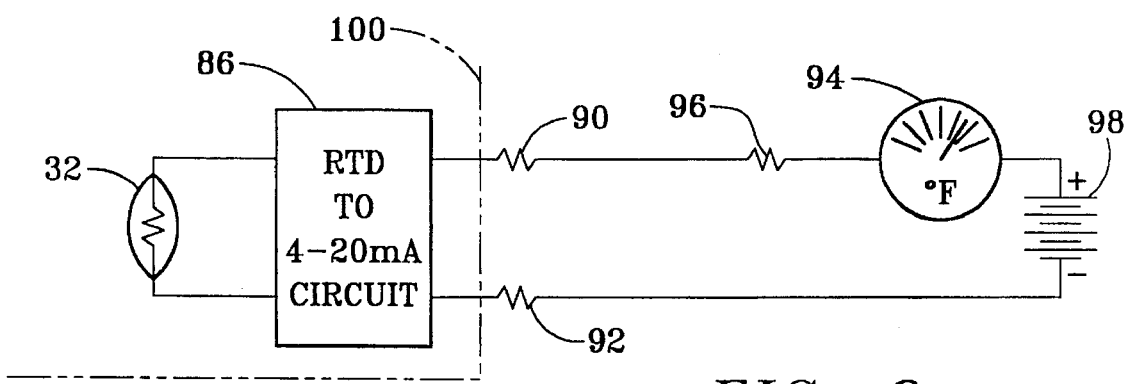
FIG. 8 is a schematic diagram of the electrical system of FIG. 7 for transmitting the sensed information to the outside of the housing.

FIG. 8 illustrates the electrical circuitry of FIG. 7, schematically. The output of the signal conditioning device 86 is connected through contact resistances 90 and 92 of the transmitter 50 to an ammeter 94, with additional loop resistance 96, and is powered by a loop power supply 98. Phantom line 100 indicates the extremity of the bearing to show that the sensor 32 and the signal conditioning device 86 are located within the bearing.

Although the figures show embodiments with the stationary race/sensor mount assembly providing an outer raceway and the rotatable race providing an inner raceway, it should be understood that the present invention is not to be limited to that configuration. That is, the stationary race/sensor mount assembly could be a shaft or inner race, instead of a housing, and the rotatable race could be an outer race. In that case, the wires 64 and 66 and the ports 71 and 72 could be provided in a shaft or other central mounting.

Only one sensor-transmitter-system has been described in detail. The structure of the other two sensor-transmitter-systems disclosed in the Figures is substantially the same as the sensor-transmitter described.

Having described the invention, what is claimed is:

1. In combination:

a housing;

a rotatable member within said housing serving as a race;

a stationary race/sensor mount assembly mounted in the housing having a greater inside diameter than the outside diameter of the rotatable member and serving as a raceway and having at least one sensor mount;

a plurality of rollers located in the annular space between the rotatable member and the stationary race/sensor mount assembly;

a sensor located on the inside surface of the sensor mount;

electrical contacts located on the outside surface of the sensor mount, the sensor mount having a hole interconnecting the sensor and the electrical contacts;

electric wires extending through said hole for sending electric signals from the sensor to the electrical contacts;

a transmitter mounted in said housing, said transmitter having members therein which contact the electrical contacts located on the outside surface of the sensor mount;

said housing having holes extending from the transmitter through the housing for receiving wires for transmitting signals from the transmitter to electronic systems located outside the housing.

2. The combination of claim 1 wherein:

said sensor mount has a groove extending circumferentially partially along its outside surface;

and the electrical contacts are metal strips mounted in the groove.

3. The combination of claim 2 wherein:

the transmitter members in contact with the metal strips extending circumferentially partially along the outside surface of the sensor mount are spring loaded balls.

4. The combination of claim 1 further comprising:

signal conditioning means electrically connected between the sensor and the electrical contacts for providing a standard current loop to the electrical contacts.

5. The combination of claim 4 wherein:

the sensor is a resistive temperature device (RTD) and the signal conditioning means is an integrated circuit providing a 4–20 mA current loop.

6. A bearing with a sensor system, the combination comprising:

a rotatable member having a first raceway;

a stationary race/sensor mount assembly having a second raceway;

a plurality of rollers located in a annular space between the first raceway and the second raceway;

a sensor located on the stationary race/sensor mount assembly;

signal conditioning means located on the stationary race/sensor mount assembly and electrically connected to the sensor for converting signals from the sensor to a standard current loop; and electrical contact means located on the stationary race/sensor mount assembly and electrically connected to the signal conditioning means for permitting electrical connection to a temperature indicator outside the stationary race/sensor mount assembly.

7. The bearing and sensor system of claim 6 wherein:

the stationary race/sensor mount assembly is an outer race and the rotatable member is an inner race.

8. The bearing and sensor system of claim 6 wherein:

the sensor is a resistive temperature device (RTD) and the signal conditioning means is an integrated circuit providing a 4–20 mA current loop.

9. The bearing and sensor system of claim 6 wherein:

the signal conditioning means includes electronic circuitry for linearizing the standard current loop with respect to the signals from the sensor.

10. A bearing with a sensor system, the combination comprising:

a rotatable member having a first raceway;

a stationary race/sensor mount assembly having a second raceway;

a plurality of rollers located in a annular space between the first raceway and the second raceway;

a sensor located on the stationary race/sensor mount assembly;

electrical contact means located on the stationary race/sensor mount assembly and electrically connected to the sensor; and spring loaded balls engageable with the electrical contact means for permitting electrical connection to an electronic system outside the stationary race/sensor mount assembly.

* * * * *